March 24, 1970 J. H. ROGERS 3,502,154
MINIMUM TILLAGE IMPLEMENT
Filed Nov. 9, 1966
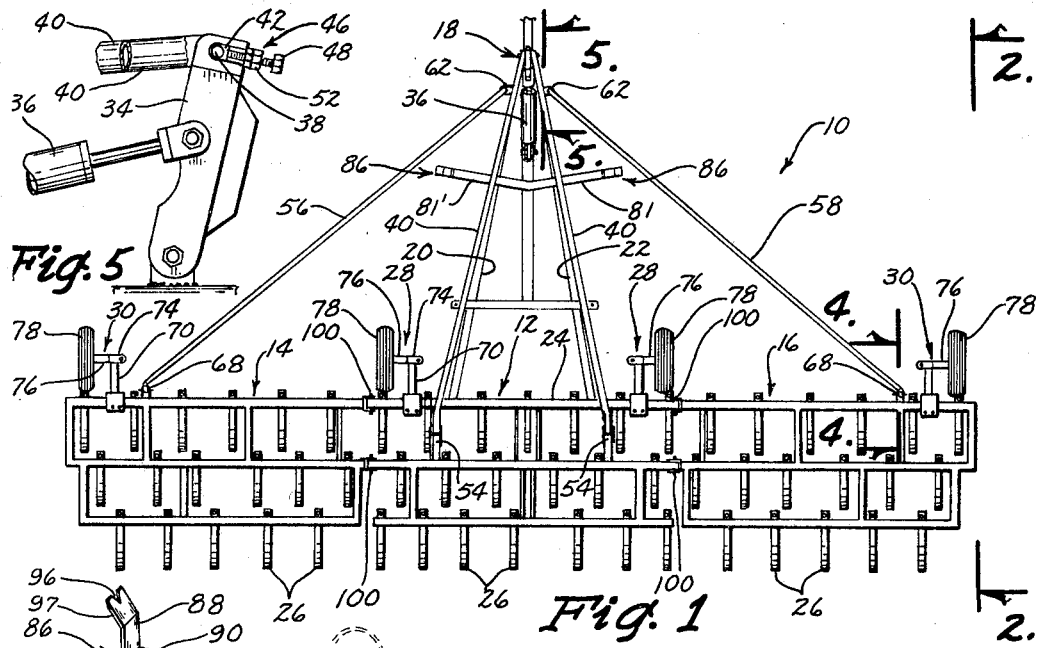
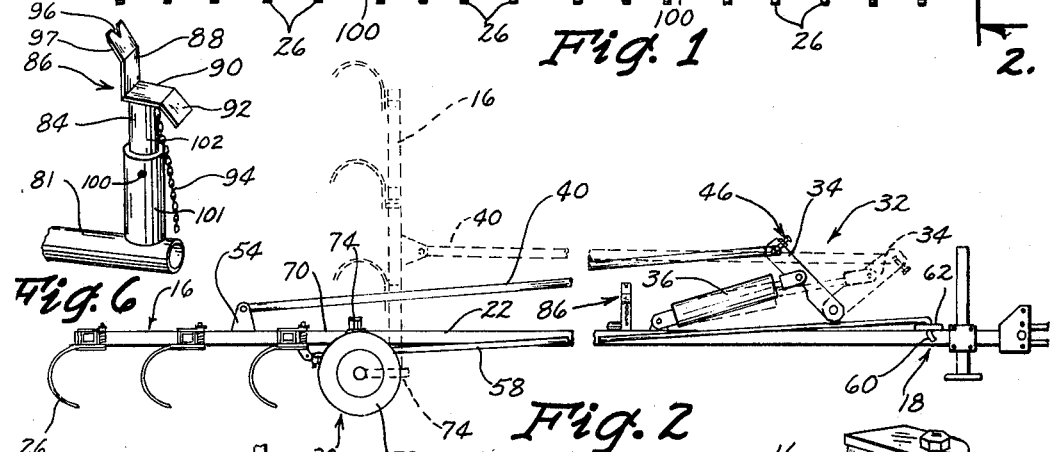
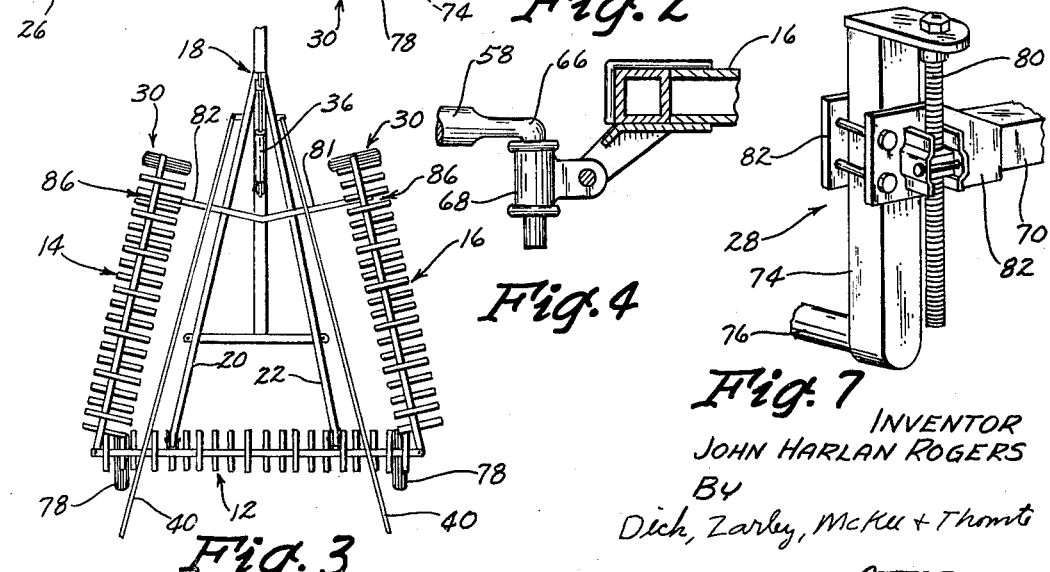
INVENTOR
JOHN HARLAN ROGERS
BY
Dick, Zarley, McKee & Thomte
ATTORNEYS

3,502,154
MINIMUM TILLAGE IMPLEMENT
John Harlan Rogers, Fort Dodge, Iowa, assignor to The Standard Engineering Company, Fort Dodge, Iowa
Filed Nov. 9, 1966, Ser. No. 593,031
Int. Cl. A01b *19/04, 63/20, 63/32*
U.S. Cl. 172—311                                                3 Claims

ABSTRACT OF THE DISCLOSURE

A minimum tillage implement including a frame having a plurality of ground working members secured thereto. A tongue assembly is connected to said frame and the frame is supported by a ground engaging wheel assembly. A lift assembly is connected between the frame and tongue for pivoting the frame between a horizontal working position to an upright travelling position. The frame also includes two wing frames which may be pivoted inwardly and forwardly of a center frame for travelling purposes.

---

It is one of the objects of this invention to provide a minimum tillage implement which when in operation is easily adjusted to provide the desired ground penetration by the ground working tools. This depth adjustment may be accomplished by raising and lowering the implement relative to stationary ground engaging support wheels and thereby eliminate the necessity of pivoting the wheel assemblies into the ground to raise the implement.

A still further object of this invention is to provide a minimum tillage implement having a center section with wing sections at opposite ends thereof wherein the wing sections may be quickly moved to a transport position. Through the use of the hydraulic lift on the implement the implement may be pivoted from a horizontal working position to a travelling or transport upright position. The wing frames are pivoted forwardly and inwardly along the tongue structure and are raised hydraulically onto the support arms carried by the tongue.

A still further object of this invention is to provide a minimum tillage implement having a support arm for wing implements when in their transport position which includes a bracket for quickly attaching and detaching the wing implements to the support arms.

A still further related object of this invention to provide a minimum tillage implement having a center section with wing sections and having brace members extending from the tongue structure on the center section to the outer ends of the wing sections wherein the brace member may be readily removed from the wing sections by simply lifting it out of a socket and may be detached from the tongue if desired but during normal usage will not accidentally become detached from either the tongue or the wing sections thereby providing foolproof operation of the implement and minimizing the time required to convert the implement between transport and working positions.

Yet another related object of this invention is to provide a minimum tillage implement having a power cylinder for raising and lowering the implement between working and transport positions wherein adjustable means has been provided that enables the quick removal and attachment of the hydraulic cylinder by the use of an adjustable stop means which will relieve the pressures on the hydraulic cylinder.

A still further object of this invention is to provide a minimum tillage implement having a center section and wing sections with ground engaging support wheels extending forwardly of each of the sections whereby when the implement is pivoted to an upright travelling position it is raised off the ground as the ground engaging support wheels pivot rearwardly under the implement. The wing sections are pivotally connected to the center implement section and are adapted to be pivoted upwardly and downwardly to selectively raise above the ground their outer ends when the wings are in an upright folded position as the center frame in its transport position is pivoted forwardly and rearwardly. This structure and operation thereby eliminates the need of manually lifting the outer ends of the wings into engagement with the support arms on the tongue structure. In the folded transport position the wheels on the wing sections are off the ground and only the wheels on the center section contact the ground and support the implement.

A further object of this invention is to provide a minimum tillage implement which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a top plan view of the minimum tillage implement;

FIG. 2 is a side elevation view taken along line 2—2 in FIG. 1 and illustrating the implement in both its ground working position and its raised travelling or transport position;

FIG. 3 is a top plan view of the implement similar to FIG. 1 but illustrating the implement in its folded transport condition;

FIG. 4 is an enlarged fragmentary cross-sectional view taken along line 4—4 in FIG. 1 and showing in particular the brace connection to the wing section;

FIG. 5 is an enlarged fragmentary elevation view taken along line 5—5 in FIG. 1 and showing in particular the adjustable connection for the power lift cylinder;

FIG. 6 is a perspective view of the support bracket on the tongue arms for holding the wing sections in their transport positions; and FIG. 7 is a perspective view of the adjustable wheel assembly.

The minimum tillage implement of this invention is generally referred to in FIG. 1 by the reference numeral 10 and is seen to include a center section 12 with outer wing sections 14 and 16. A tongue assembly 18 is pivotally connected through members 20 and 22 to the forward frame member 24 as seen in FIG. 3. Each of the implement sections are provided with a series of spring teeth 26 for working the ground. The penetration of the spring teeth 26 is controlled by the adjustable wheel assemblies 28 on the center section 12 and 30 on the wing sections 14 and 16.

The adjustable wheel assemblies are shown and described in detail in applicant's co-pending application entitled Adjustable Axle Assembly, Ser. No. 574,685, filed Aug. 24, 1966 now abandoned.

A hydraulic lift assembly 32 is provided on the tongue structure 18 and includes a pivotal upright member 34 connected to the tongue assembly and connected to a hydraulic cylinder 36 secured to the tongue assembly whereby the upright post 34 is reciprocated forwardly and rearwardly upon being operated. In FIG. 5 it is seen that a pin 38 on the end of a pair of converging lift arms 40 is received in an elongated slot 42 formed in the outer end of the upright post 34. The pressure on the lift cylinder 36 may be relieved by an adjustable stop assembly 46 which includes a bolt 48 threadably mounted on the post 34 for moving in the elongated slot 42 to vary the slot's length. When the bolt 48 is fully extended into the slot 42 the pin 38 must remain stationary relative to the post 34, however upon retracting the bolt 48 the post 34 is free to move sufficiently to take the pressure off the power cylinder 36 and thereby remove the pins connecting it to the post 34 and the tongue assembly 18. When the implement is to be used the adjustable stop bolt 48 is tightened down against the pin 38 and lock nuts 52 are tightened down to hold the adjustable stop 48 in position.

The lift arms 40 are connected to upstanding ears 54 on the center section 12 rearwardly of the tongue connection of the members 20 and 22 to the forward edge of the center frame section 12 thereby upon actuation of the cylinder 36 the center frame section will be caused to pivot about an axis through the connection of the tongue members 20 and 22 to the center frame section.

The wing sections 14 and 16 pivoted to the center section 12 by hinges 100 and when in their horizontal position relative to the center section 12 are held by a pair of brace members 56 and 58 extending between the forward end of the tongue assembly 18 and the outer forward edges of the wing sections 14 and 16 respectively. The forward ends of the brace rods as seen in FIG. 6 include a downwardly extending portion which merges into a downwardly and forwardly extending portion 60. These two portions are received in an opening formed in a socket-like member 62 secured to the forward end of the tongue assembly 18. To remove the brace member 58 from engagement with the socket member 62 it is necessary to raise the rear end of the brace upwardly and then lift the forward end out of the socket when the portion 60 is aligned properly in the opening in the socket member 62. The rear end of the brace members 56 and 58 includes a right angle shaft portion 66 which is received in a socket member 68 having a vertical opening. The socket member 68 is pivotally secured to the forward edge of the frame of the wing section. Thus, when the implement is being readied for conversion to its travelling or folded condition the braces 56 and 58 are simply lifted at their rearward ends out of the connecting socket 68. During operation, the weight of the braces 56 and 58 will hold the right angle pin portion 66 in the socket 68.

The wheel assemblies 28 and 30 include a forwardly extending member 70 bolted onto the forward edge of the frame sections. A yoke is provided on the forward end of the member 70 and slidably receives a bar 74 connected by an axle 76 to a wheel 78. The bar 74 is controlled in its movement relative to the implement frame by a threaded bolt 80 connected at its upper end to the bar 74 and threadably engaging the outer end of the forwardly extending member 70. Thus, upon the wheel assembly being threadably adjusted the height of the implement will be varied relative to the ground engaging wheels supporting the implement. The member 70 has a pair of end plates 82 engaging the bar 74 and upon adjustment of the screw 80 the member 70 will be raised and lowered. It is seen as the implement is raised and lowered that the wheels remain stationary and are not required to pivot rearwardly for raising the implement. The pivoting of the rear wheels rearwardly has been found to require an excessive amount of torque since the wheels are forced into the ground thus the wheel adjustment illustrated and described is superior.

When the wing sections 14 and 16 are moved to their folded position in FIG. 3 the outer ends are supported on a pair of arms 81 and 81 connected to the tongue structure 18. As seen in FIG. 6, a vertically adjustable post 84 is secured to the outer end of the arm 81 and is provided with a bracket 86. Post 84 is vertically adjustable by any convenient means such as pin 100 extending through post sections 101 and 102, post section 102 being slidably received by post section 101. The bracket 86 has an upwardly extending flange 88 integral with a horizontally extending portion 90 which merges into a downwardly extending lip portion 92. A chain 94 secured to the underside of the portion 90 is adapted to extend over the horizontal portion 90 and engage a V-shaped notch 96 in an outwardly flaring portion 97 on the upwardly extending flange 88.

Thus it is seen in operation that when the implement is being used to work the ground the height of the implement sections 12, 14 and 16 may be selectively adjusted by the wheel assemblies 28 and 30 to give the desired spring tooth penetration into the soil. When the implement 10 is to be transported into the braces 56 and 58 are simply lifted out of their sockets 68 at the rear ends thereof and placed across the center section 12 as seen in FIG. 3. The hydraulic lift cylinder 36 is used to pivot the implement sections to an upright position as seen in FIG. 2 and then the wing sections 15 and 16 are rolled on their wheel assemblies 30 forwardly and inwardly. By appropriate adjustment of the hydraulic lift cylinder 36 the wing sections at their outer ends will be pivoted up to the proper height to ride onto the lip portion 92 of the bracket 86 and seat on the portion 90 whereupon the chain 94 may secure the sections in place on the support arms 81 and 81. It is to be appreciated that the wings 14 and 16 are raised off the ground at their outer ends such that the wheels are spaced above the ground.

When it is desired to use the lift cylinder 36 for another job and removal of it from the implement 10 is required, the pressure on it may be removed by simply adjusting the adjustable stop 46 such that the upright post 34 may be moved back and forth with respect to pin 38 so that the pins holding the cylinder 36 in place may be removed.

Some changes may be made in the construction and arrangement of my minimum tillage implement without departing from the real spirit and purpose of my invention, and it is my intention to cover by my claims, any modified forms of structure or use of mechanical equivalent which may be reasonably included within their scope.

I claim:

1. A ground working implement comprising,
   an implement frame having a plurality of ground working members,
   a tongue assembly connected to said frame,
   a ground engaging wheel assembly connected to said frame, and
   a lift assembly connected between said tongue and said frame for pivoting said frame between a horizontal working position to an upright travelling position,
   said wheel assembly including a height adjusting means for raising and lowering said frame relative to said wheel assembly when said frame is in said horizontal working position,
   and means for maintaining said frame in a substantially constant horizontal relationship with respect to said wheel assembly when said frame is being raised or lowered through its range of working positions,
   said wheel assembly including a hroizontal support portion exending forwardly of said frame, a vertical support portion operatively connected to the wheel means of said wheel assembly and adjustably connected to said horizontal support portion, the planes of said horizontal and vertical support portions extending at a right angle to each other, said horizontal support portion being in the same plane as said frame, said vertical support being transverse to the plane of said frame so that said frame will remain constantly horizontally disposed when said frame is being raised or lowered through its range of working conditions,
   said tongue assembly being pivotally connected to said frame adjacent the forward edge of said frame and said lift assembly being connected to said frame rearwardly of said forward edge and the connection of said tongue to said frame whereby when said lift assembly is operated said frame pivots about an axis through said tongue connection to the frame and said wheel moves from a position forwardly of said frame when said frame is in a horizontal position to a position rearwardly and under said frame when said frame is in an upright position, said horizontal support portion being disposed in a plane above the rotational axis of the wheel means of said wheel assembly, said implement frame including a center frame having a pair of said wheel assemblies and a pair of wing frames, one at each end of said center frame, a wheel assembly on each of said wing frames, said wing frames being pivotally connected to said center frame to pivot about an axis in the plane of said frame and extending transversely of said frame whereby when said frame is pivoted to an upright position said wing frame may be pivoted inwardly and forwardly of said center frame for said travelling position, a support arm on opposite sides of said tongue assembly for supporting the outer end of said wing frames with said wheels on said wing frames being off the ground when said wing frames are in said travelling position, each of said support arms including a vertically adjustable post, a bracket on said post having a center horizontally positioned portion, a side upright flange and a downwardly and outwardly disposed flange portion on the opposite side of said center portions, a flexible means secured to one of said side portions and adapted to extend over said center portion and be adjustably secured to the other side portion to hold the adjacent wing frame in said travelling position, a side brace extending from adjacent the forward end of said tongue assembly on each side thereof to each of said wing frames, a socket on each wing frame having a vertical opening, the rear end of each side brace having a downwardly extending end portion for being detachably received in said vertical opening in said socket whereby said side braces may be detached from said wing frames for pivoting said wing frames to said travelling position by raising said rear ends out of said sockets, the forward end of each of said side braces including a first portion extending downwardly which merges into a second portion extending downwardly and outwardly, a socket having a vertical opening for each of said side braces on said tongue, said forward end of each of said braces being shaped to be attached and detached from said socket on said tongue upon said brace being positioned to extend upwardly and rearwardly whereby said first and second portions on the forward end of said brace may be threaded through said vertical opening in said tongue socket.

2. A ground working implement comprising,
an implement frame having a plurality of ground working members,
a tongue assembly connected to said frame,
a ground engaging wheel assembly connected to said frame, and
a lift assembly connected between said tongue and said frame for pivoting said frame between a horizontal working position to an upright travelling position,
said wheel assembly including a height adjusting means for raising and lowering said frame relative to said wheel assembly when said frame is in said horizontal working position,
and means for maintaining said frame in a substantially constant horizontal relationship with respect to said wheel assembly when said frame is being raised or lowered through its range of working positions,
said wheel assembly including a horizontal support portion extending forwardly of said frame, a vertical support portion operatively connected to the wheel means of said wheel assembly and adjustably connected to said horizontal support portion, the planes of said horizontal and vertical support portions extending at a right angle to each other, said horizontal support portion being in the same plane as said frame, said vertical support being transverse to the plane of said frame so that said frame will remain constantly horizontally disposed when said frame is being raised or lowered through its range of working conditions,
said tongue assembly being pivotally connected to said frame adjacent the forward edge of said frame and said lift assembly being connected to said frame rearwardly of said forward edge and the connection of said tongue to said frame whereby when said lift assembly is operated said frame pivots about an axis through said tongue connection to the frame and said wheel moves from a position forwardly of said frame when said frame is in a horizontal position to a position rearwardly and under said frame when said frame is in an upright position, said horizontal support portion being disposed in a plane above the rotational axis of the wheel means of said wheel assembly,
said lift assembly including an elongated member having a rear end pivotally connected to said frame, and an upright post pivotally mounted on said tongue, adjustable connecting means connecting the forward end of said elongated member to said post, a hydraulic power cylinder pivotally connected between said tongue and said upright post, said connecting means including an elongated opening formed in the forward end of said post, a pin connected to the forward end of said elongated member and being movably mounted in said elongated opening, an adjustable stop element in said elongated opening selectively movable to vary the length of said elongated opening and thereby permit said post to be moved forwardly and rearwardly with respect to said pin and said elongated member so that pressure on the pivotal connections of said hydraulic cylinder may be removed to permit said hydraulic cylinder to be easily detached from the implement.

3. The structure of claim 2 wherein said horizontal support portion includes a clamp means slidably embracing said vertical support portion, said clamp means having a threaded nut means rigidly secured thereto, said vertical support portion having a rotatable bolt means secured thereto and being threadably received by said nut means, the rotation of said bolt means in one direction causing said horizontal support portion and said frame to be raised with respect to the ground, the rotation of said bolt means in an opposite direction causing said horizontal support portion and said frame to be lowered with respect to the ground.

References Cited
UNITED STATES PATENTS

| 2,304,383 | 12/1942 | Strandlund | 172—427 X |
| 2,618,350 | 11/1952 | Von Ruden | 172—674 X |
| 2,958,383 | 11/1960 | Danielson | 172—456 |
| 3,021,908 | 2/1962 | Dlugosch | 172—466 |
| 3,373,822 | 3/1968 | Hornung | 172—311 |

ROBERT E. BAGWILL, Primary Examiner

STEPHEN C. PELLEGRINO, Assistant Examiner

U.S. Cl. X.R.

172—419, 456; 248—49